United States Patent [19]

Ueda et al.

[11] Patent Number: 4,591,264
[45] Date of Patent: May 27, 1986

[54] AUTO EXPOSURE CONTROL DEVICE FOR READER-PRINTER

[75] Inventors: Nobuo Ueda, Sagamihara; Masafumi Fujita, Kawasaki, both of Japan

[73] Assignee: Minolta Camera Kabushiki Kaisha, Osaka, Japan

[21] Appl. No.: 696,218

[22] Filed: Jan. 29, 1985

[30] Foreign Application Priority Data

Jan. 31, 1984 [JP] Japan .................................. 59-17409
Jan. 31, 1984 [JP] Japan .................................. 59-17410

[51] Int. Cl.⁴ ........................ G03B 27/80; G03B 27/74
[52] U.S. Cl. ........................................... 355/68; 355/69
[58] Field of Search ..................... 355/68, 69; 356/444

[56] References Cited

U.S. PATENT DOCUMENTS

| | | | |
|---|---|---|---|
| 3,790,275 | 2/1974 | Huboi et al. | 355/68 |
| 3,926,518 | 12/1975 | Berry et al. | 355/68 X |
| 3,977,778 | 8/1976 | Seko et al. | 355/68 X |
| 4,367,033 | 1/1983 | Watanabe . | |
| 4,433,906 | 2/1984 | Nukatani et al. . | |

FOREIGN PATENT DOCUMENTS 58-187922 11/1983 Japan .

Primary Examiner—L. T. Hix
Assistant Examiner—Della Rutledge
Attorney, Agent, or Firm—Wolder, Gross & Yavner

[57] ABSTRACT

There is disclosed an automatic exposure control device for use in a reader-printer which controls the amount of exposure in accordance with outputs of photodetectors arranged in an optical path. Each photodetector is connected to a comparator which is supplied with comparison voltage through changes of the comparison voltage stepwise. The control device changes the amount of variation per step of comparison voltage in accordance with a change of the type of film to the positive or to the negative, and limits the photodetectors to be used for controlling only to the photodetectors being capable of receiving the light of micro film image.

10 Claims, 10 Drawing Figures

AUTO EXPOSURE CONTROL DEVICE FOR READER-PRINTER

FIELD OF THE INVENTION

The present invention relates to an auto exposure control device for use in reader-printers for viewing images on microfilms or making copies thereof.

BACKGROUND OF THE INVENTION

The quality of microfilms varies greatly from low to high depending on the production conditions, the kind of film, etc. It is difficult for users in general to judge the quality of a particular microfilm and determine the proper amount of exposure by observing the reduced image on the film. In the case of the reader mode wherein the microfilm image is projected on a screen on enlargement, the user can adjust the film image to an easily viewable brightness by controlling the quantity of light of the illuminating lamp, but when in the printer mode, it is extremely difficult to determine the proper amount of exposure for the photoconductive member.

Accordingly, reader-printers have been proposed which have a photodetector disposed in a light path for detecting the microfilm image to determine the proper amount of exposure as disclosed, for example, in U.S. Pat. No. 4,433,906. With the disclosed technique, the single photodetector is provided at an intermediate portion of the light path to receive unfocused image-forming rays incident thereon. However, it is likely that the arrangement fails to determine the amount of exposure with high precision, for example, when the film has an uneven distribution of densities.

The present applicant has therefore proposed in Japanese Laid-Open Patent Application No. SHO 58-187922 a system wherein a plurality of photodetectors are arranged in an optical path, and an optimum amount of exposure is determined from a maximum and a minimum of quantity of light received by these photodetectors. With this system, each photodetector is connected to a comparator, and the comparison voltage to be applied to the comparator is varied stepwise. The photodetector has its state changed when the varying comparison voltage reaches a level corresponding to the quantity of light received. Accordingly, the comparison voltage which causes one of the photodetectors to change its state first and the comparison voltage which finally causes the change of state in the last one can be detected by checking the photodetectors for the change of state, and the proper amount of exposure can be calculated from appropriate equations with use of the voltage values. The calculation equations are prepared specifically for negative films, as well as for positive films. The system provides optimum amounts of exposure for films of very poor to good qualities.

With the above system, identical stepwise variations of comparison voltage are used for preparing positive copies from negative films (hereinafter referred to as "N→P") and for producing positive copies from positive films (hereinafter referred to as "P→P"). Amounts of exposure can be determined even when the variations in the comparison voltage level are common for the two cases. However, the precision of measuring the amount of light is lower through positive films than through negative films, because the positive film has a larger blank area (transparent area) than the negative film, permitting all the comparators to give an output at a lower comparison voltage than is the case with the negative film, and further because the photodetector has a relatively larger area than characters and is therefore greatly influenced by blank portions even when receiving the light through image areas. For example, when a positive film and a negative film which are usual and approximately the same in the ratio of characters are compared, the comparison voltage at which one of the comparators gives an output first is much lower for the positive film than for the negative film, and even the comparison voltage causing all the comparators to produce an output for the positive film is lower than the comparison voltage for causing one of the comparators to produce an output first for the negative film. Experiments conducted on a large number of films of different qualities have shown that on the average the comparison voltage for causing all the comparators to give an output for positive films is about ⅓ of the corresponding voltage for negative films.

Thus, although the range of variations of the comparison voltage is different for different types of films, the comparison voltage level is varied stepwise by the same amount at each step for the different types. This means that the number of steps in the variation range for the positive film is exceedingly smaller than the number of steps in the variation range for the negative film. In other words, the light through the positive film is measured with lower precision relative to the variation range than the light through the negative film.

Images are recorded on microfilms in different orientations with respect to the length or width of the film, depending on the contents of the record. Accordingly, reader-printers are generally so adapted that the size (as well as the orientation) of paper is selectable. With some reader-printers, the magnification is also selectable. When the above auto exposure control system is used for such a reader-printer which is designed for the selection of paper size and the magnification, it is likely that some of the photodetectors arranged in the optical path will not receive the light through the image on the film but will be exposed to the light through a portion other than the image area, depending on the image size of the film. When auto exposure control is effected in such a state, the output of the photodetectors corresponding to the above-mentioned portion other than the image area will be processed also as information as to the film image, with the resulting likelihood that a satisfactory copy will not be obtained owing to a noise contained in the amount of exposure calculated.

The problem may be overcome by arranging photodetectors only for the overlapping portions of all the image sizes selectable, but this still fails to provide a basic solution because satisfactory copies are not available from images of large size which has an uneven distribution of densities.

Thus, the foregoing system has the drawback of being not always capable of determining amounts of exposure fully accurately because of the difference between positive and negative, the difference in size or like difference.

SUMMARY OF THE INVENTION

Accordingly, the main object of the present invention is to overcome the drawbacks of the foregoing prior art and to provide an auto exposure control device for reader-printers which is capable of determining amounts of exposure accurately.

Another object of the invention is to provide an auto exposure control device for reader-printers which is capable of determining amounts of exposure approximately with the same degree of high precision for both negative films and positive films Another object of the invention is to provide an auto exposure control device for reader-printers which is capable of determining optimum amounts of exposure regardless of changes in paper size or magnification.

The above objects can be fulfilled by changing the amount of variation per step of comparison voltage in accordance with a change of the type of film to the positive or to the negative when the film is so changed and by effecting such control that when the paper size or magnification is changed, only the signals from photodetectors receiving light through the contemplated image of the size determined by this parameter are used for calculation.

BRIEF DESCRIPTION OF THE DRAWINGS

These and other objects and features of the present invention will become apparent from the following description of a preferred embodiment thereof taken in conjunction with the accompanying drawings, in which.

DETAILED DESCRIPTION OF THE INVENTION

Figure 1:
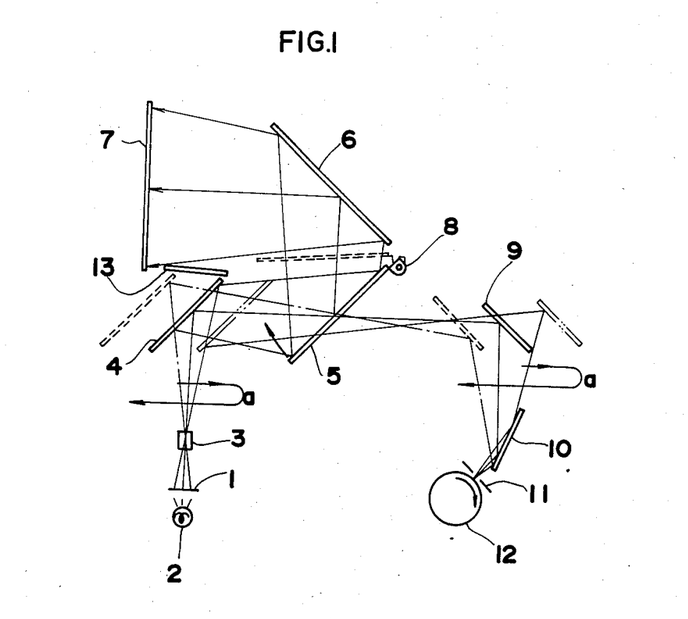
FIG. 1 is a diagram showing a reader-printer optical system embodying the present invention.

FIG. 1 shows the optical system of a microfilm reader-printer of the slit exposure type. In the reader mode, the image on a microfilm 1 illuminated by a lamp 2 is projected on a screen 7 via a projection lens 3, first scanning mirror 4, pivotal mirror 5 and fixed mirror 6.

In the printer mode, on the other hand, the pivotal mirror 5 is rotated about a pivot 8 and retracted to a broken-line position, and a photoconductive drum 12 is exposed to the optical image of the microfilm 1 via the first scanning mirror 4, a second scanning mirror 9, fixed mirror 10 and slit 11. The first scanning mirror 4 and the second scanning mirror 9 are mounted on an unillustrated frame, are horizontally movable together in reciprocation and are held at rest in solid-line positions during the reader mode. When the mode is changed to the printer mode, these mirrors are first moved along paths of movement indicated at a to two-dot-and-dash positions, from which the mirrors are moved toward dotted-line positions at a given speed for a slit exposure. The image formed on the drum 12 by the exposure is made into a copy image on paper by a known electrophotographic process. The construction of the reader-printer optical system stated above is disclosed in detail in U.S. Pat. No. 4,367,033.

Figures 2A, 2B:
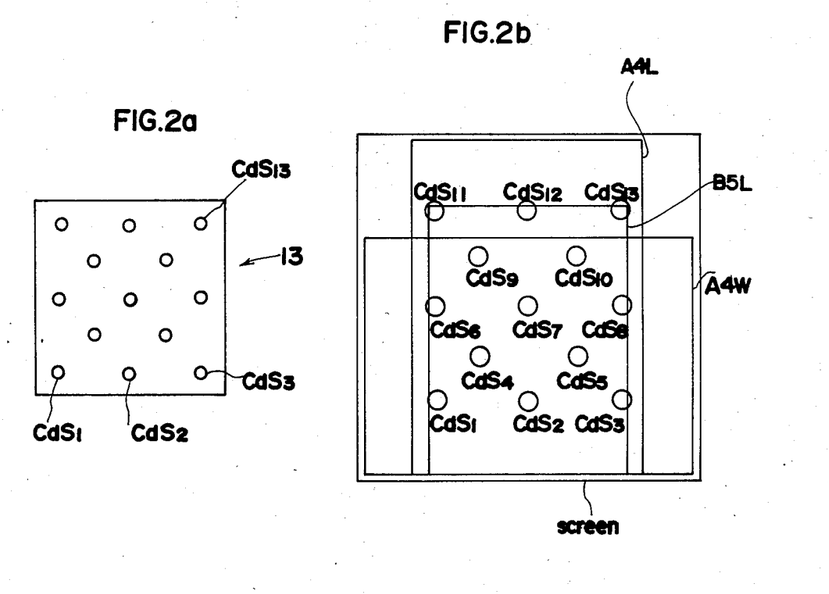
FIG. 2a is a plan view showing a photodetecting member according to the embodiment of the invention.
FIG. 2b is a diagram showing, as projected on a screen, an arrangement of photodetectors on the photodetecting member and paper sizes usable.

In the above reader-printer, a photodetecting member 13 according to the present invention is disposed above the first scanning mirror 4. As seen in FIG. 2a, the photodetecting member 13 comprises a plurality of CdS photodetectors CdS1, . . . , CdS13 in a uniform arrangement. The photodetecting member 13 is adapted to receive the image forming light approximately through the entire area of the microfilm 1 when the first scanning mirror 4 has moved to the two-dot-and-dash position. However, some of the photodetectors are not always exposed to the optical film image. FIG. 2b shows the relation between the arrangement of the photodetectors and the position of the paper usable, as projected on the screen 7. Two paper sizes, i.e. A4 size and B5 size, are used for the present embodiment. Sheets of A4 size and B5 size are fed in the direction of their length (hereinafter referred to as "A4, B5 lengthwise feed"). A4 sheets are alternatively fed in the direction of their width (hereinafter referred to as "A4 widthwise feed"). The film image is projected in corresponding relation to the paper portion to be used. In FIG. 2b, the lower sides of lengthwise fed A4 and B5 sheets and a widthwise fed A4 sheet are in register, and these coinciding sides are the leading ends of the sheets with respect to the paper feed direction. The leading ends are thus adapted to be in register with respect to the paper feed direction to assure a definite registration timing for positioning the leading ends of sheets in register with the forward ends of toner images on the photoconductive drum. Consequently, the photodetectors CdS11, CdS12 and CdS13 are unable to receive the light through the film image in the case of A4 widthwise feed. The present embodiment is therefore so controlled that the outputs of these photodetectors are not used for the measurement of light in the case of A4 widthwise feed as will be described later.

According to the present embodiment, the control for determining the voltage to be applied to the lamp for printing is effected before the first scanning mirror 4 starts scanning after reaching the two-dot-and-dash position. However, since the photodetecting member 13 needs only to receive the optical image of the microfilm illuminated for a given period of time by the lamp to which a specified voltage is applied, the position of the photodetecting member 13 is not limited to the illustrated position of the embodiment. For example, the member 13 may be disposed behind a half mirror as shielded from the external light by a polarizing member and used as the pivotal mirror 5 or fixed mirror 6. The above embodiment, although of the slit exposure type when in the printer mode, may of course be a reader-printer of the stationary exposure type.

Figure 3:
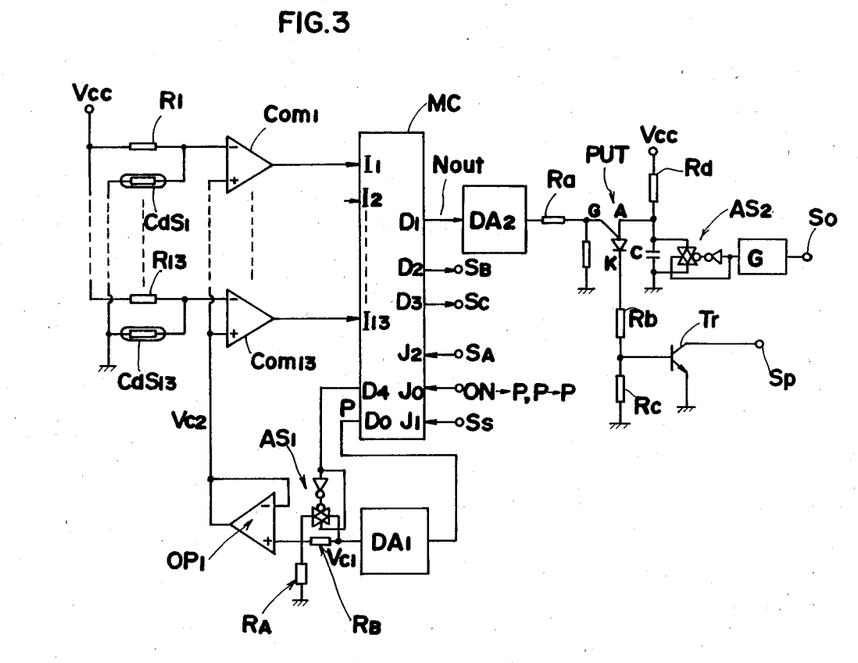
FIG. 3 is a diagrm showing an example of circuit for the embodiment of the invention.

FIG. 3 shows an example of circuit for effecting auto exposure control with the output of the photodetecting member 13. With reference to FIG. 3, a voltage Vcc is applied to the negative terminals of comparators Com.1, . . . , Com.13 via resistors R1, . . . , R13, respectively, while each of the photodetectors CdS1, . . . , CdS13 is grounded at one end and connected at the other end to the negative terminal of the corresponding comparator. On the other hand, comparison voltage Vc2, which is varied stepwise, is applied to the positive terminals of the comparators.

The comparison voltage Vc2 is provided by a D/A converter DA1 for producing a voltage Vc1 in proportion to the number of pulses P received, the pulses P being produced with a specified period from an output port D0 of a microcomputer MC, an operational amplifier OP1 serving as a voltage follower and having an output terminal connected to the positive terminals of the comparators, an analog switch AS1 connected between the D/A converter DA1 and the operational amplifier OP1 to open or close in response to a signal from an output port D4 of the microcomputer MC, and resistors RA and RB. The resistor RB is connected between the D/A converter DA1 and the operational amplifier OP1 and has the analog switch AS1 connected to its opposite ends. The resistor RA has one end connected to the junction of the analog switch AS1 and the resistor RB on the amplifier side and the other end which is grounded. The resistors RA and RB are set to such resistances that the resistance of the analog switch AS1 is negligible when the switch is on.

The output port D4 of the microcomputer MC produces a signal "H" in the case of N→P, or a signal "L" for P→P. The analog switch AS1 is turned on in response to the signal "H". Accordingly, when N→P, the opposite ends of the resistor RB are short-circuited, permitting direct application of the voltage Vc1 to the operational amplifier OP1, which in turn delivers the voltage as it is, with the result that Vc2=Vc1. In the case of P→P, on the other hand, the analog switch AS1 is off, so that the voltage to be impressed on the operational amplifier OP1, namely, comparison voltage Vc2, is $$Vc2 = \frac{RA}{RA + RB} \cdot Vc1$$

According to the present embodiment, RA:RB=1:2. Thus, the comparison voltage for P→P is ⅓ of the comparison voltage for N→P. The output port D0 produces 256 pulses from "0" to "255". The comparison voltage therefore varies stepwise through 256 steps. The stepwise increase of the comparison voltage turns on the comparators for the photodetectors one after another. Based on the change of state of the comparators from off to on, an optimum amount of exposure is calculated according to the present embodiment as will be described later in detail. The different comparison voltages are used for N→P and P→P for the following reason. The positive film has many blank portions, while the photodetector has a large area relative to characters, so that the blank portions produce a greater influence than the overall white-to-black ratio of the film image. It therefore follows that the number of pulses for turning on the comparators for all the photodetectors is smaller for the positive film than for the negative film and is about ⅓ of the number in the latter case. Accordingly, when the increment of the comparison voltage per pulse is reduced to ⅓ of the increment in the latter case, the measurement for the positive film can be accomplished with nearly the same precision as in the case of the negative film.

The outputs of the comparators thus obtained are individually fed to input ports I1 to I13 of the microcomputer MC.

The microcomputer MC is a known one which comprises a read-only memory ROM having stored therein the calculation equations to be described later, a random access memory RAM for temporarily storing input data, calculation results, etc., a central processing unit CPU for performing calculations, and the like. As stated above, the signals from the photodetecting member 13 are fed to the input ports I1 to I13 of the microcomputer MC, which further has other input ports, i.e., an input port J0 for receiving N→P/P→P change signal according to whether the microfilm is negative or positive, an input port J1 for receiving a measurement start signal SS which is emitted upon the arrival of the first scanning mirror 4 at the two-dot-and-dash position, namely, an exposure start position, and an input port J2 for receiving a size signal SA indicating the paper to be used. As already mentioned, the output port D0 delivers pulses P to the D/A converter DA1 with a specified period. With the increase in the count number of pulses P, the D/A converter DA1 successively increases its output voltage Vc1 to provide comparison voltage Vc2 according to whether the film is negative or positive.

The result of calculation performed within the microcomputer according to the input from the photodetecting member 13 is delivered as an output of pulse number Nout from an output port D1 to a D/A converter DA2. The pulse number Nout serves as a signal for controlling the voltage to be applied to the lamp as will be described later in detail. Since there is a limitation on the controlled increase in the quantity of light from the lamp when the film is generally very dark although having high contrast, another output port D2 delivers a bias change signal SB for compensating for the deficiency with developing bias voltage. Such a case occurs, for example, when there is a need to use a dark lens for giving a high magnification for enlargement. Further an output port D3 gives other control signal SC.

The pulse number Nout from the output port D1 is converted by the D/A converter DA2 to an analog voltage in proportion to the pulse number, and the voltage is fed to the gate G of a programmable unijunction transistor PUT via a resistor Ra. The cathode K of the transistor PUT is grounded through resistors Rb and Rc. The midpoint between the resistors Rb and Rc is connected to the base of a transistor Tr. The transistor Tr produces a phase control signal SP by virtue of the on-off action of the transistor PUT. This signal is fed to an unillustrated known phase control circuit, which subjects the voltage to be applied to the lamp 2 to phase control.

On the other hand, the anode A of the transistor PUT is connected to the midpoint between a resistor Rd and a capacitor C which are connected together in series and to which the voltage Vcc is applied. Connected to opposite ends of the capacitor C is an analog switch AS2, to which a zero-cross synchronizing signal S0 is applied via a gate circuit G.

Briefly stated, the above circuit functions as follows. While a microfilm is being illuminated with the lamp to which a given voltage is applied, a change in the state of the photodetectors CdS1, . . . , CdS13 is detected with application of varying comparison voltage Vc2, and based on the information obtained, the quantity of light of the lamp is determined which involves correction of contrast. The lamp 2 is subjected to phase control as timed by the zero-cross synchronizing signal S0. This will be described in greater detail with reference to the flow charts of FIGS. 4a and 4b and the time chart of FIG. 5.

Figure 4A:
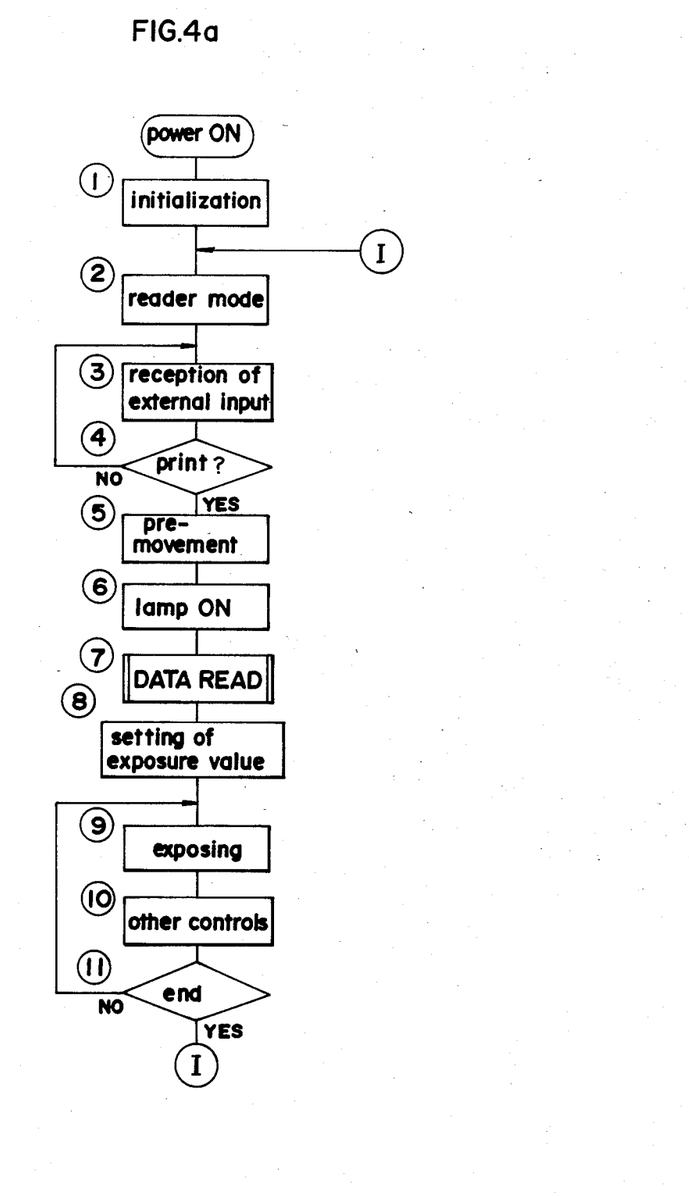
FIGS. 4a and 4b are flow charts showing a control process for the embodiment of the invention.

The flow chart of FIG. 4a shows the overall control process for the reader-printer. When the power supply is turned on, step 1 is performed for initialization. In step 2, the machine is set to the reader mode, in which the mirrors are in the solid-line positions in FIG. 1 to project the image of the microfilm 1 on the screen 7. In step 3, turning-on of the print switch and other inputs, for example, of number of copies are accepted. Step 4 checks whether the print switch is on. If the interrogation of step 4 is answered with NO, step 3 follows again. These steps are repeated until step 4 proves YES.

When the answer to the inquiry of step 4 is YES, the machine is in the printer mode. In step 5, the mirror system performs a pre-movement. More specifically, the pivotal mirror 5 is raised to the broken-line position, and the scanning mirrors 4 and 9 are moved to the exposure start position indicated in two dot-and-dash lines. Upon the scanning mirrors reaching the exposure start position, a measurement start signal SS (see FIG. 5) is fed to the microcomputer MC. The lamp 2 is turned on by the specified voltage in step 6, and the data from the photodetecting member is read in step 7.

Figure 4B:
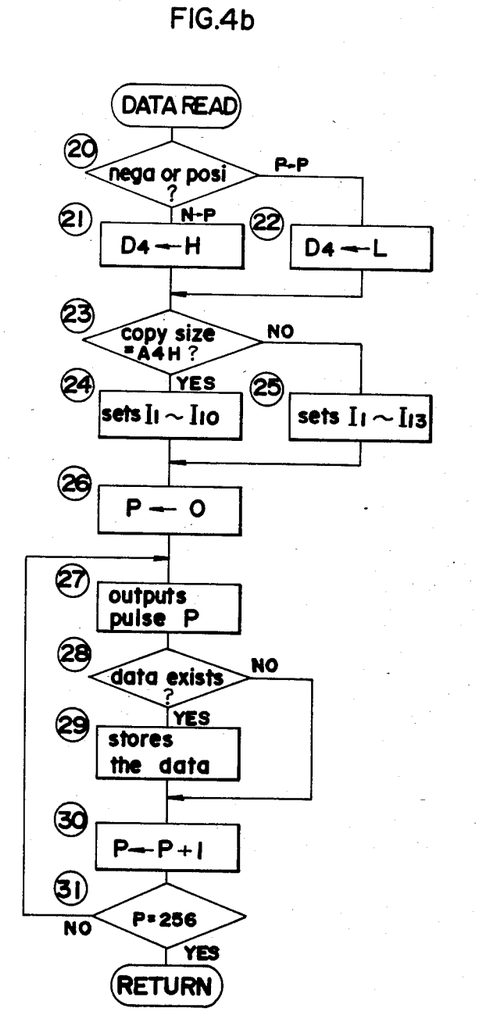
Figure 5:
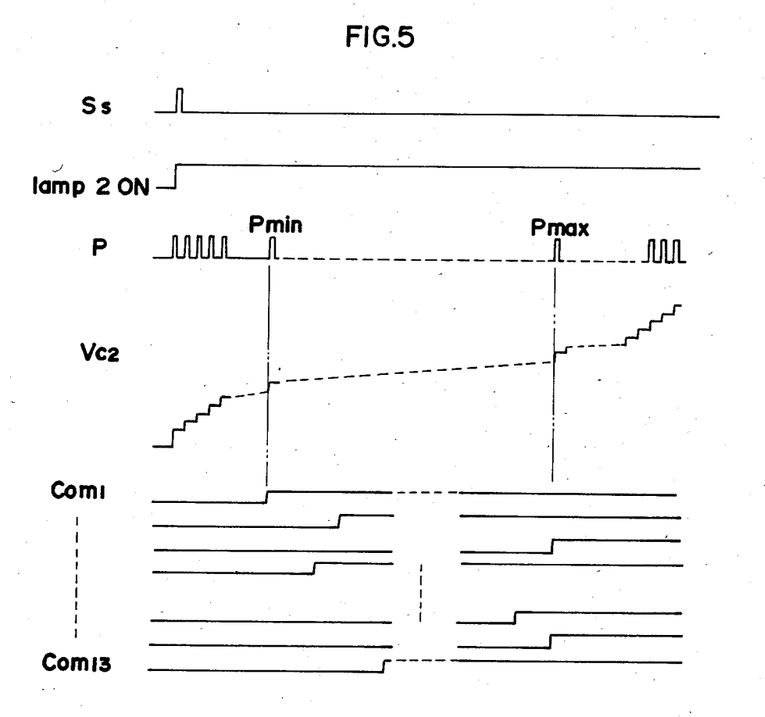
FIG. 5 is a time chart showing changes in the state of comparator outputs.

The reading of the data is shown in the subroutine of FIG. 4b. In steps 20, and 21 or 22, a signal "H" or "L" is delivered from the output port D4 to the analog switch AS1 depending on whether the film is negative or positive. In the following steps 23, and 24 or 25, the photodetectors to be used for the measurement of light are determined according to the paper size specified, such that in the case of A4 widthwise feed, only the signals fed to the input ports I1 to I10 for CdS1 to CdS10 are used for the measurement, whereas if otherwise, all the signals fed to the input ports I1 to I13 are used. After the number of pulse P is initialized to "0" in step 26, a pulse is produced from the output port D0 in step 27. The subsequent step 28 checks whether data is available. The data contains the number of comparators which deliver an output and the number of pulses corresponding to the comparison voltage concerned. If data is available, step 29 stores the data in a predetermined area within the RAM. Subsequently, "1" is added to the number of pulses P in step 30. Step 31 checks whether the pulse number P reaches "256". If the answer is YES, the sequence returns to the main routine. Steps 27 to 31 are repeated until the pulse number P reaches "256", and the comparison voltage is increased for every loop. On the other hand, the voltage delivered from each of the photodetectors CdS1, . . . , CdS13 exposed to light to the negative terminal of the corresponding one of the comparators Com.1, . . . , Com.13 does not increase or decrease although differing from detector to detector depending on which portion of the microfilm the incident light has passed through. Accordingly, the comparator output changes its state from L to H at a certain time point as shown in FIG. 5. When the microfilm is a negative film, the image area is nearly transparent and transmits a large quantity of incident light, so that the change in the state of the comparator output occurs when the comparison voltage is low. Conversely, the nonimage area, which passes little or no light therethrough, causes no change in the state until the comparison voltage becomes high. Such changes of state are stored in the RAM as data in step 29.

After the subroutine has been performed for the completion of data reading, an optimum amount of exposure is determined in step 8 based on the data stored. In the case of N→P, the exposure amount is determined using the pulse number Pmin causing the first change in the state of comparators and the pulse number Pmax causing the change of state to all the comparators. In the case of P→P, the pulse number Pmin only is used.

In the case of N→P, the pulse number Nout to be given to the D/A converter DA2 is calculated from the following equations with use of Pmin and Pmax.

$$N1 = a(Pmax - \alpha - \gamma) \quad (1)$$
$$(N1 < N1max, VB = 300 \text{ V})$$
$$N1' = a(Pmax - \beta - \gamma) \quad (2)$$
$$(N1 \geq N1max, VB = 400 \text{ V})$$
$$\Delta = a\{\gamma - \tfrac{1}{2}(Pmax - Pmin)\} \quad (3)$$
(where when $\Delta < 0$, $\Delta = 0$)

$$\left.\begin{array}{l} Nout = N1 + \Delta (N1 < N1max) \\ Nout = N1' + \Delta (N1 \geq N1max) \end{array}\right\} \quad (4)$$

Figure 6:
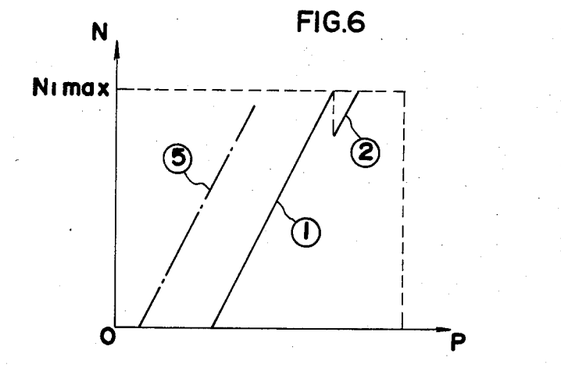
FIGS. 6 and 7 are diagrams showing relations involved in equations for calculating amounts of exposure.

In Equations (b 1) to (4), a, $\alpha$, $\beta$, $\gamma$ and N1max are values determined by experiments. These equations are graphically represented as shown in FIG. 6. Lines (1) and (2) represent the relation between P and Nout when microfilms of sufficiently high contrast are reproduced satisfactorily. Equation (2) in particular represents the case where the quantity of light of the lamp is increased with correction of the bias for films which are generally dark. The pulse number Nout for determining the power to be applied to the lamp is obtained by adding the amount of contrast correction $\Delta$ given by Equation (3) to N1 or N1' given by Equation (1) or (2) [Equation (4)].

Line (5) representing the following equation $$N = a(Pmax - \alpha) \quad (5)$$

shows a limit for reproducing films of very low contrast without fog. The above constants a, $\alpha$, $\beta$ and $\gamma$ are so determined that Line (5) will not be exceeded.

Figure 7:
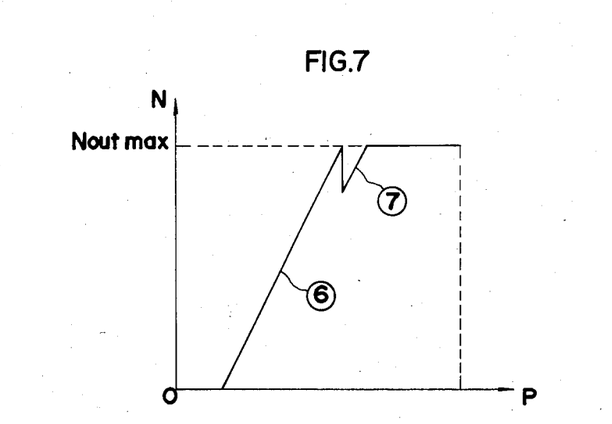

In the case of P→P, on the other hand, the film is almost transparent with the exception of extreme cases. The difference between Pmax and Pmin is small, and there is little or no need for the correction of contrast. For positive films, therefore, the pulse number Nout is determined from Equation (6) or (7) below (see FIG. 7).

$$Nout = b(Pmin - \alpha') \quad (6)$$

$$(Nout < Noutmax, VB = 300 \text{ V})$$

$$Nout = b(Pmin - \beta') \quad (7)$$

$$(Nout \geq Noutmax, VB = 375 \text{ V})$$

In these equations, b, $\alpha'$, $\beta'$ and Noutmax are constants which are determined by experiments. In the case of Equation (7) which is used for correcting a reduction in the quantity of light due to the magnification of lens, etc., the bias voltage is also altered.

Figure 8:
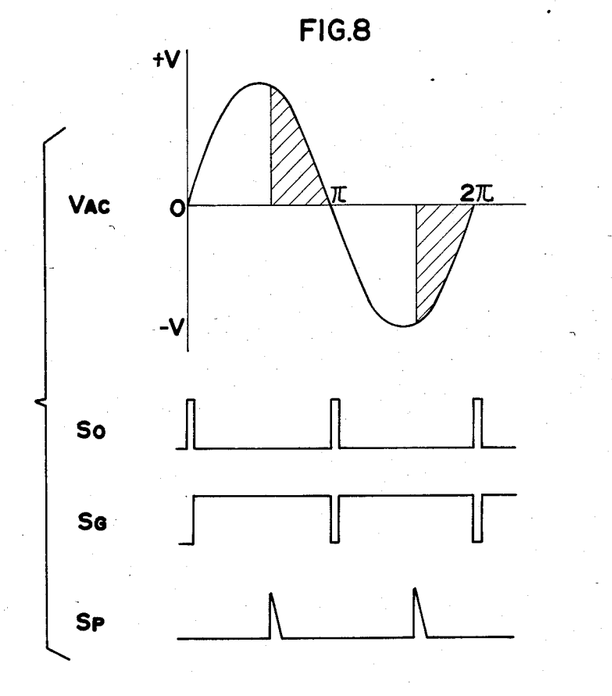
FIG. 8 is a diagram showing lighting of a lamp under phase control.

After the optimum amount of exposure has been determined in this way, the photoconductive drum is exposed to the image of the microfilm at the exposure value (step 9). The exposure control process will be described with reference to FIG. 3. The pulse number Nout determined is converted by the D/A converter DA2 to a voltage, which is then fed to the gate of the transistor PUT. On the other hand, the gate circuit G has applied thereto a zero-cross synchronizing signal S0 which is in synchronism with the phase of an a.c. power supply VAC for the lamp 2. As seen in FIG. 8, the signal S0 is inverted to a gate signal SG, which is fed to the analog switch AS2. The analog switch AS2 conducts when the gate signal SG is at L level. The capacitor C is repeatedly charged and discharged by the on-off action of the analog switch AS2. By the voltage on the anode A provided by the charge of the capacitor C and the gate voltage determined by the value Nout, the transistor PUT determines the angle of conduction for phase control, causing the transistor Tr to produce a phase control signal SP. The lamp 2, which is controlled by the phase control signal SP, is turned on at a specified voltage with use only of the hatched portions of power shown in FIG. 8.

Step 10 includes a drive control procedure for the scanning system, an image forming process control procedure, etc. These control procedures, although executed of course during the above exposure, are not relevant to the present invention directly and are therefore referred to generally as step 10.

Step 11 is provided for repeating steps 9 and 10 until the specified number of copies are completed. On completion of copying operation, the sequence returns to step 2, i.e. the reader mode.

According to the present invention, the control process described determines an optimum amount of exposure for any film to give a satisfactory copy.

Calculations are performed in the following manner with use of the above equations.

First in the case of N→P, the constants are $a=2$, $\alpha=50$, $\beta=80$, $\gamma=48$ and Nlmax=210. Listed below are the states of portions of a microfilm and pulse numbers P causing a change in the state of the corresonding comparator outputs.

| State of portions of microfilm | Pulse number |
|---|---|
| (a) Bright image area | 60 |
| (b) Dark image area | 100 |
| (c) Bright nonimage area | 120 |
| (d) Dark nonimage area | 220 |

(i) In the combination of (a) and (b), the nonimage area is bright and the image area is also sufficiently bright, so that the microfilm is nearly standard. The terms "bright" and "dark" are herein used relatively; it is to be noted that the image area and the nonimage area differ in the degree of brightness or darkness. In the case of the above combination, Pmin=60, and Pmax=120. Substitution of these values in Equation (1) gives $$Nl = 2(120 - 50 - 48) = 44$$

Since Nlmax>Nl, the bias voltage is set to the standard value of 300 V. Thus, no bias change signal SB is produced.

Next, from Equation (3), $$\Delta = 2\{48 - \tfrac{1}{2}(120-60)\} = 36$$

Thus, $\Delta = 36$ is the amount of contrast correction. The actual Nout given by Equation (4) is $$Nout = 44 + 36 = 80$$

This pulse number is delivered to the D/A converter DA2.

(ii) With the combination of (a) and (d), the film has very high contrast but is generally dark. In this case, Equation (1) gives $$Nl = 2(220 - 50 - 48) = 244$$

Because Nl>Nlmax, Equation (2) provides $$Nl' = 2(220 - 80 - 48) = 184$$

Since Nl>Nlmax in this case, a bias change signal SB is produced to change the developing bias to 400 V. From Equations (3) and (4), $$\Delta = 2\{48 - \tfrac{1}{2}(220-60)\} = -64$$

The negative value for $\Delta$ indicates very high contrast. Since there is no need of contrast correction in this case, the above value, i.e. Nl'=184, is fed to the D/A converter DA2 as actual Nout.

(iii) With the combination of (b) and (c), the film has very low contrast. In this case, from Equations (1) and (3), $$Nl = 2(120 - 50 - 48) = 48$$
$$\Delta = 2\{48 - \tfrac{1}{2}(120-100)\} = 76$$

Since the nonimage area is relatively bright, the illuminance needed would be such that N1=44, if the film had high contrast. However, because of the very low contrast, the amount of correction $\Delta$ is great to give increased illuminance. Accordingly, actual illuminance is determined from Equation (4), that is, $$Nout = 44 + 76 = 120$$

This pulse number is fed to the D/A converter DA2.

In this way, calculations are performed for N→P to eventually determine the pulse number corresponding to the optimum voltage to be applied to the lamp by determining an appropriate pulse number for standard contrast from Equation (1) or (2) with use of Pmax corresponding to the nonimage area density and subsequently correcting the standard pulse number with use of an amount of correction $\Delta$ for the actual contrast. The contrast is corrected based on very high contrast in such manner that the quantity of light of the lamp is increased as the contrast diminishes.

Next, the case of P→P will be described with reference to specific examples. In this case, the constants are $b=4$, $\alpha'=20$, $\beta'=30$ and Noutmax=210. Listed below are two examples of microfilms and the pulse number P, i.e. Pmin, causing the first change in the state of the comparator output for each example.

| State of microfilm | Pmin |
|---|---|
| (a) Usual positive film illuminated through bright lens | 40 |
| (b) fogged Film illuminated through dark lens | 80 |

In the case of (a), the Pmin value is substituted in Equation (6) to obtain $$Nout = 4(40 - 20) = 80$$

Since Nout<Noutmax, the bias voltage VB is set to the standard of 300 V, and the lamp is lighted with a voltage corresponding to the pulse number of 80, whereby proper copies can be obtained automatically.

In the case of (b), Equation (6) gives $$Nout = 4(80 - 20) = 240$$

Since Nout>Noutmax, the condition is not satisfied. Accordingly, Equation (7) is used to obtain $$N'out = 4(80-30) = 200$$

This pulse number is used for turning on the lamp, and the bias voltage is set to 375 V, whereby proper copies can be obtained automatically.

What is claimed is:

1. An automatic exposure control device for use in a reader-printer duplicating from negative and positive films, comprising:
   a plurality of photodetectors arranged in an optical path projecting an image of a microfilm;
   a plurality of comparators having first inputs connected with respective photodetectors;
   means for supplying a stepwise varying comparison voltage to a second input terminal of each comparator; control means responsive to the outputs of said comparators for determining the amount of exposure from maximum and/or minimum quantity of light detected by said photodetectors; and
   means for changing the amount of variation per step of the comparison voltage in accordance with a change of the type of film to the positive or to the negative, whereby the available number of steps for the comparison voltage is of approximately the same level for the positive and negative films.

2. An automatic exposure control device for use in a reader-printer comprising;
   a plurality of photodetectors arranged in an optical path projecting an image of of microfilm,
   control means for determining the amount of exposure from outputs of these photodetectors and,
   means for limiting the photodetectors to be used by the control means only to the photodetectors capable of receiving the light of the film image.

3. An automatic exposure control device for use in a reader printer duplicating from negative and positive films, comprising:
   a plurality of photodetectors disposed to receive projected image light and outputting light voltages corresponding to the intensity of the incident image light;
   supply means for supplying a stepwise changing comparison voltage;
   a plurality of comparators, each receiving said light voltages at one input terminal and said comparison voltage at the other input terminal thereof, each comparator outputting a detecting signal when said comparator voltage and said light voltage have a predetermined relationship;
   control means for determining the amount of exposure, from maximum comparison voltage by which every said comparators output the detecting signals and/or minimum comparison voltage by which at least one comparator outputs the detecting signal; and
   change means for changing the amount of variation per step of the comparison voltage in accordance with a change of the type of film to the positive or to the negative, whereby the available number of steps for the comparison voltage are at approximately the same level.

4. An automatic exposure control device as claimed in claim 3, wherein said change means decreases the amount of variation per step of the comparison voltage in accordance with a change of the type of film from the negative to the positive.

5. An automatic exposure control device as claimed in claim 4, further comprising means for limiting the photodetectors to be used by the control means only to the photodetectors capable of receiving the light of film image.

6. In an automatic exposure control device in a duplicating machine employing different types of originals and including an original light image projector, a plurality of photodetector devices disposed to sense the light at different parts of the projected image light rays and producing light voltages in accordance with the intensity of the respective sensed incident light, supply means for producing a stepwise varying comparison voltage, a plurality of comparators having said light voltages applied to respective first inputs thereof and said comparison voltage applied to second inputs thereof and having outputs which are functions of the respective inputs and means responsive to a function of said comparator, outputs for controlling the exposure of said image projector, the improvement comprising means for adjusting the voltage increment step variation of said supply means to compensate for the type of original.

7. The exposure control means of claim 6 wherein the numbers of comparison voltage steps available for the respective original types are of approximately the same level.

8. The exposure control device of claim 6, wherein said originals and negative and positive transparencies and said step adjusting means are controlled to produce voltage steps which are smaller and larger for positive and negative transparencies respectively.

9. The exposure control device of claim 7, wherein said originals and negative and positive transparencies of said step adjusting means are controlled to produce voltage steps which are smaller and larger for positive and negative transparencies respectively.

10. The exposure control device of claim 6, including means for deactivating selected of said photodetector devices in accordance with dimensions and orientation of the copy substrate.

* * * * *